(12) United States Patent
Chen et al.

(10) Patent No.: US 11,556,834 B1
(45) Date of Patent: Jan. 17, 2023

(54) FREQUENCY PLACEMENT FOR QUBIT READOUT RESONATORS

(71) Applicant: Google LLC, Mountain View, CA (US)

(72) Inventors: Zijun Chen, Santa Barbara, CA (US); Julian Shaw Kelly, Santa Barbara, CA (US)

(73) Assignee: Google LLC, Mountain View, CA (US)

( * ) Notice: Subject to any disclaimer, the term of this patent is extended or adjusted under 35 U.S.C. 154(b) by 215 days.

(21) Appl. No.: 17/123,481

(22) Filed: Dec. 16, 2020

Related U.S. Application Data (60) Provisional application No. 62/948,666, filed on Dec. 16, 2019.

(51) Int. Cl.
  *G06N 10/00* (2022.01)
(52) U.S. Cl.
  CPC .................. *G06N 10/00* (2019.01)
(58) Field of Classification Search
  CPC ..................................... G06N 10/00
  See application file for complete search history.

(56) References Cited

U.S. PATENT DOCUMENTS

| | | | |
|---|---|---|---|
| 2016/0112031 A1* | 4/2016 | Abraham | H03K 17/92 327/528 |
| 2018/0137430 A1* | 5/2018 | Chow | H01L 39/2493 |

OTHER PUBLICATIONS

Kelly, "Engineering superconducting qubit arrays for Quantum Supremacy." Bulletin of the American Physical Society, Mar. 2018, 63(1) (Abstract).

\* cited by examiner

*Primary Examiner* — Nghia M Doan
(74) *Attorney, Agent, or Firm* — Fish & Richardson P.C.

(57) ABSTRACT

A device includes: a plurality of qubits arranged in a two-dimensional array and a plurality of readout resonators. Each readout resonator of a first readout resonator group is arranged to electromagnetically couple to a respective qubit of a first qubit group. Each readout resonator of a second readout resonator group is arranged to electromagnetically couple to a respective qubit of a second qubit group. A resonance frequency of each readout resonator of the first readout resonator group is within a first resonance frequency band, and a resonance frequency of each readout resonator of the second readout resonator group is within a second resonance frequency band that is different from the first resonance frequency band.

24 Claims, 5 Drawing Sheets

FREQUENCY PLACEMENT FOR QUBIT READOUT RESONATORS

CROSS-REFERENCE TO RELATED APPLICATION

This application claims priority to U.S. Provisional Patent Application No. 62/948,666, filed Dec. 16, 2019, the entirety of which is incorporated herein by reference.

BACKGROUND

Large-scale quantum computers have the potential to provide fast solutions to certain classes of difficult problems. Multiple challenges in the design and implementation of quantum architecture to control, program and maintain quantum hardware impede the realization of large-scale quantum computing.

SUMMARY

The present disclosure relates to frequency placement for qubit readout resonators.

In general, in some aspects, the subject matter of the present disclosure may be embodied in devices that include a plurality of qubits arranged in a two-dimensional array and a plurality of readout resonators. Each qubit of the plurality of qubits is arranged to electromagnetically couple to a respective readout resonator of the plurality of readout resonators. The device includes a first readout transmission line arranged to electromagnetically couple to a first readout resonator group of at least two readout resonators of the plurality of readout resonators. Each readout resonator of the first readout resonator group is arranged to electromagnetically couple to a respective qubit of a first qubit group of at least two qubits of the plurality of qubits. The device includes a second readout transmission line arranged to electromagnetically couple to a second readout resonator group of at least two readout resonators of the plurality of readout resonators. Each readout resonator of the second readout resonator group is arranged to electromagnetically couple to a respective qubit of a second qubit group of at least two qubits of the plurality of qubits. A resonance frequency of each readout resonator of the first readout resonator group is within a first resonance frequency band, and a resonance frequency of each readout resonator of the second readout resonator group is within a second resonance frequency band that is different from the first resonance frequency band.

The foregoing and other embodiments can each optionally include one or more of the following features, alone or in combination. For example, in some embodiments, the first qubit group is directly adjacent to the second qubit group.

In some embodiments, the first resonance frequency band is non-overlapping with the second resonance frequency band.

In some embodiments, the first resonance frequency band is separated from the second resonance frequency band by at least 500 MHz.

In some embodiments, the first readout transmission line is arranged to electromagnetically couple to a first amplifier, and the first resonance frequency band is within an amplifier frequency band of the first amplifier. The second readout transmission line is arranged to electromagnetically couple to a second amplifier, and the second resonance frequency band is within an amplifier frequency band of the second amplifier. The amplifier frequency band of the first amplifier is different from the amplifier frequency band of the second amplifier.

In some embodiments, each readout resonator of the first readout resonator group has a respective resonance frequency that is different from the respective resonance frequencies of the other readout resonators of the first readout resonator group.

In some embodiments, the respective resonance frequencies of the readout resonators of the first readout resonator group are separated from one another by at least 50 MHz.

In some embodiments, the respective resonance frequencies of the readout resonators of the first readout resonator group are separated from one another by at least a linewidth of each readout resonator.

In some embodiments, each qubit of the first qubit group is arranged to electromagnetically couple to at least one qubit of the second qubit group, and each qubit of the second qubit group is arranged to electromagnetically couple to at least one qubit of the first qubit group.

In some embodiments, each qubit of the first qubit group is arranged to capacitively couple to at least one qubit of the second qubit group, and each qubit of the second qubit group is arranged to capacitively couple to at least one qubit of the first qubit group.

In some embodiments, the first qubit group extends along a first diagonal of the two-dimensional array, and the second qubit group extends along a second diagonal of the two-dimensional array.

In general, in some aspects, the subject matter of the present disclosure may be embodied in methods that include providing a plurality of qubits, a plurality of readout transmission lines, and a plurality of readout resonators. The plurality of qubits are arranged in a two-dimensional array. A first readout transmission line is arranged to couple to a first group of at least two readout resonators of the plurality of readout resonators. Each readout resonator of the first readout resonator group is coupled to a qubit of a first group of at least two qubits of the plurality of qubits. A second readout transmission line is arranged to couple to a second group of at least two readout resonators of the plurality of readout resonators. Each readout resonator of the second readout resonator group is coupled to a qubit of a second group of at least two qubits of the plurality of qubits. The method includes tuning a qubit frequency of each qubit of the first qubit group to within a first qubit frequency band and tuning a qubit frequency of each qubit of the second qubit group to within a second qubit frequency band. The first qubit frequency band is non-overlapping with the second qubit frequency band.

The foregoing and other embodiments can each optionally include one or more of the following features, alone or in combination. For example, in some embodiments, the first qubit frequency band is separated from the second qubit frequency band by at least 750 MHz.

In some embodiments, the first qubit group extends along a first diagonal of the two-dimensional array, and the second qubit group extends along a second diagonal of the two-dimensional array.

In some embodiments, the first qubit group along the first diagonal is directly adjacent to the second qubit group along the second diagonal.

In some embodiments, a resonance frequency of each readout resonator of the first readout resonator group is within a first resonance frequency band, and a resonance frequency of each readout resonator of the second readout resonator group is within a second resonance frequency band that is different from the first resonance frequency band.

In some embodiments, a method includes providing a first amplifier arranged to couple to the first readout transmission line, the first amplifier having a first amplifier frequency band, and providing a second amplifier positioned to couple to the second readout transmission line, the second amplifier having a second amplifier frequency band. The second amplifier frequency band is different from the first amplifier frequency band. The first resonance frequency band is within the first amplifier frequency band, and the second resonance frequency band is within the second amplifier frequency band.

In some embodiments, the first resonance frequency band is non-overlapping with the second resonance frequency band.

In some embodiments, for each qubit of the first qubit group, a frequency difference between the qubit frequency of the qubit and a resonance frequency of a corresponding readout resonator of the first readout resonator group to which the qubit is coupled is between 1.0 GHz and 1.8 GHz. For each qubit in the second qubit group, a frequency difference between the qubit frequency of the qubit and a resonance frequency of a corresponding readout resonator in the second readout resonator group to which the qubit is coupled is between 1.0 GHz and 1.8 GHz.

In some embodiments, each qubit of the plurality of qubits has a respective anharmonicity. For each qubit of the first qubit group and for each qubit of the second qubit group, a frequency difference between the qubit frequency of the qubit and a resonance frequency of a corresponding readout resonator to which the qubit is coupled is at least six times the respective anharmonicity of the qubit.

In some embodiments, for each qubit of the first qubit group and for each qubit of the second qubit group, a frequency difference between the qubit frequency of the qubit and a resonance frequency of a corresponding readout resonator to which the qubit is coupled is at least 1.3 GHz.

In some embodiments, a method includes measuring a resonance frequency of a readout resonator of the first readout resonator group, and, based on the measured resonance frequency, determining a state of a corresponding qubit of the first qubit group to which the readout resonator is coupled.

In some embodiments, each qubit of the first qubit group is arranged to electromagnetically couple to at least one qubit of the second qubit group. Each qubit of the second qubit group is arranged to electromagnetically couple to at least one qubit of the first qubit group.

In some embodiments, the qubit-qubit couplings have a coupling rate, and the first qubit frequency band is separated from the second qubit frequency band by at least 50 times the coupling rate.

Particular embodiments of the subject matter described in this specification can be implemented to realize one or more of the following advantages. For example, in some embodiments, undesired qubit-qubit interactions can be reduced, including in the context of capacitively coupled qubits. In some embodiments, multiple readout resonators can couple to a single readout transmission line, and respective qubits coupled to the readout resonators can be read out individually. In some embodiments, signals on each readout transmission line can be amplified with a lower loss of signal fidelity. In some embodiments, qubit-resonator detunings can be maintained at values suitable for qubit readout while undesired interactions and energy relaxation can be reduced. In some embodiments, crosstalk during qubit readout can be reduced.

The details of one or more implementations are set forth in the accompanying drawings and the description below. Other features and advantages will be apparent from the description and drawings, and from the claims.

DETAILED DESCRIPTION

The present disclosure relates to frequency placement for qubit readout resonators. In particular implementations, this disclosure relates to quantum processors in which qubit readout resonators of the quantum processors have resonance frequencies within particular defined bands.

Quantum processors often include readout resonators arranged to read out the states of qubits. Each readout resonator has a resonance frequency that varies by some small amount, the "dispersive shift," depending on the state (e.g., $|0\rangle$ or $|1\rangle$) of the qubit to which the readout resonator is coupled. The readout resonator is also arranged to couple to a readout transmission line. A user, by probing the readout transmission line, can detect the resonance frequency of the readout resonator and thus infer the state of the qubit.

A qubit arranged to couple to a readout resonator can be tuned to a certain qubit frequency, with the difference between the qubit frequency and the resonance frequency of the readout resonator being the "qubit-resonator detuning." If the qubit-resonator detuning is too small, then the qubit may undergo undesired readout transitions or energy relaxation. However, if the qubit-resonator detuning is too large, then the dispersive shift may be too small to reliably detect. Therefore, the quantum processor may be designed and utilized such that all qubit-resonator detunings are within an optimal range.

In some embodiments, multiple readout resonators are arranged to couple to a single readout transmission line. To allow the qubits coupled to the respective readout resonators to be read individually, each of the readout resonators coupled to the readout transmission line may have resonance frequencies that are different from one another.

In some embodiments, a readout transmission line is arranged to couple to an amplifier, which may properly amplify signals with frequencies in a particular amplifier frequency band. To maintain a high quality of amplification, the readout resonators arranged to couple to the readout transmission line may have resonance frequencies that are within the amplifier frequency band, while still being sufficiently far apart from one another to allow individual readout of the respective coupled qubits.

In some embodiments, qubits may be arranged to couple to one another, and coupled qubits may be tuned to have qubit frequencies that are sufficiently different to allow operation of qubits in isolation. For example, the qubits may be in an array, and each qubit may be arranged to directly couple to its nearest-neighbor qubits. The strength of an interaction between two coupled qubits depends in part on the relative qubit frequencies to which the qubits are tuned, becoming stronger when the two qubit frequencies are closer together. To operate on a qubit individually, without undesired qubit-qubit interactions, the qubit frequency of the qubit may be tuned to be separated from the qubit frequencies of nearest-neighbor qubits.

This disclosure describes quantum processor design elements that allow some or all of the above design features to be included in a quantum processor.

Figure 1A:
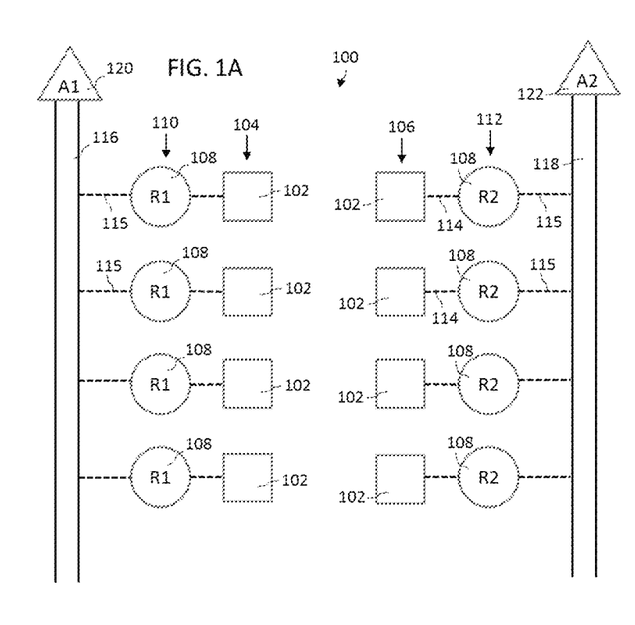
FIGS. 1A-1B are schematics showing exemplary groups of qubits and readout resonators.

In the example of FIG. 1A, a quantum processor 100 includes multiple qubits 102. The qubits 102 include a first qubit group 104 and a second qubit group 106. The qubits 102 may be arranged in, for example, a two-dimensional array, though other qubit patterns are possible.

Each qubit 102 can be tuned to a particular qubit frequency by the application of appropriate signals (e.g., microwave pulses) to control elements coupled to each qubit (not shown). Qubits 102 can be operable in two or more modes, for example, an idling mode and a readout mode, and qubits can be tuned to different frequencies depending on the current operation mode.

The quantum processor 100 also includes multiple readout resonators 108. The readout resonators 108 include a first readout resonator group 110 and a second readout resonator group 112. Each readout resonator 108 has a respective resonance frequency and is arranged to electromagnetically couple to a corresponding qubit 102, as indicated by dashed lines (e.g., couplings 114).

Each readout resonator 108 in the first readout resonator group 110 is arranged to electromagnetically couple to a first readout transmission line 116, and each readout resonator in the second readout resonator group 112 is arranged to electromagnetically couple to a second readout transmission line 118, as indicated by dashed lines (e.g., couplings 115).

The readout resonators 108 and the readout transmission lines 116, 118 may be implemented as readout transmission line resonators, for example, quarter-wave or half-wave superconductor co-planer waveguide resonators or strip-line resonators. Other resonators designs are also possible.

The readout resonators 108 may be positioned along the respective qubit readout transmission lines 116, 118 such that, during operation of the quantum processor 100, a standing wave profile established in a readout resonator 108 is matched to a standing wave profile established in the respective readout transmission line 116, 118. That is, the standing wave profile of a readout resonator 108 is both impedance and phase matched to the standing wave profile of the respective readout transmission line 116, 118. Because the standing wave profile along the readout transmission lines 116, 118 varies as a function of length, the coupling location along each readout resonator 108 will also vary.

The resonance frequency of each readout resonator 108 can be determined in part by, for example, a length of the readout resonator 108. The resonance frequency of each readout resonator 108 is also determined in part by the state of the qubit 102 to which the readout resonator 108 is arranged to electromagnetically couple, varying by the dispersive shift. This dispersive shift allows the readout of the qubit states by probing of the readout transmission lines 116, 118. However, the dispersive shift is typically small compared to the resonance frequency itself, such that it is possible to refer to designed "resonance frequencies" that approximately match the actual resonance frequency of a given readout resonator 108, regardless of any small dispersive shift induced by a coupled qubit. For example, a resonance frequency may be several GHz, and a dispersive shift may be several MHz.

As indicated in FIG. 1A, the readout resonators 108 in the first readout resonator group 110 all have resonance frequencies within a first resonance frequency band R1, and the readout resonators 108 in the second readout resonator group 112 all have resonance frequencies within a second resonance frequency band R2. The resonance frequency bands R1 and R2 may be different from one another. The resonance frequency bands R1 and R2 may be non-overlapping. The resonance frequency bands R1 and R2 may be separated from one another by, for example, at least 250 MHz, at least 500 MHz, or at least 750 MHz.

When a readout transmission line 116, 118 is probed at a frequency approximately matching the resonance frequency of a readout resonator 108 coupled to the readout transmission line 116, 118, a resulting output signal returns the current resonance frequency (e.g., the designed resonance frequency modulated by the dispersive shift), allowing the inference of the state of the qubit 102 coupled to the readout resonator 108. However, if multiple readout resonators 108 along a given readout transmission line 116, 118 have similar resonance frequencies, it may be unclear which qubit 102 is in which state. Therefore, the readout resonators 108 within each readout resonator group 110, 112 may be designed to have resonance frequencies that are different from one another. In cases where the readout resonators 108 can be characterized by a linewidth of their resonance frequencies, the resonance frequencies along each readout transmission line 116, 118 may be separated by at least the linewidth. The resonance frequencies of readout resonators 108 along each readout transmission line 116, 118 may be separated by, for example, at least 25 MHz, at least 40 MHz, or at least 50 MHz.

In some embodiments, measurement of a readout resonator may collapse the quantum state of a corresponding qubit coupled to the readout resonator. When readout resonators within each readout resonator group have different resonance frequencies, states of qubits coupled to a portion of the readout resonators may be read out without collapsing the quantum states of qubits coupled to other readout resonators in the readout resonator group.

Each readout transmission line 116, 118 is arranged to couple to a respective amplifier 120, 122. Each amplifier 120, 122 may be, for example, a Purcell filter. In some embodiments, each amplifier 120, 122 may only perform its function properly (e.g., with higher magnitudes of amplification and with constant amplification levels across frequencies) within a respective amplifier frequency band A1, A2. Therefore, the resonance frequency band R1 may be within A1, and the resonance frequency band R2 may be within A2, such that an amplifier 120, 122 is not expected to amplify signals with frequencies outside of its respective amplifier frequency band.

Amplifier frequency bands may have bandwidths of, for example, 200 MHz, 300 MHz, or 400 MHz. In embodiments in which corresponding resonance frequency bands are within respective amplifier frequency bands, resonance frequency bands may have corresponding bandwidths, e.g., bandwidths less than 200 MHz, 300 MHz, or 400 MHz.

Figure 1B:
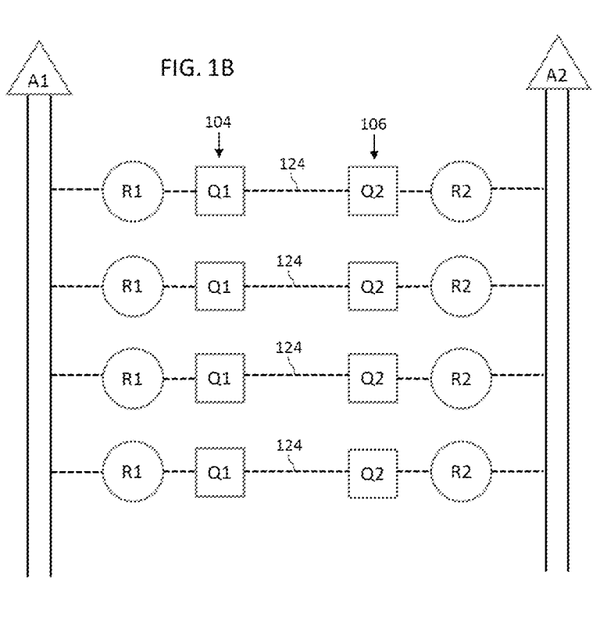

FIG. 1B shows a quantum processor having the configuration of the quantum processor 100 of FIG. 1A. The components of FIG. 1B operate as described for the components of FIG. 1A, except where noted otherwise.

In the example of FIG. 1B, each qubit within the first qubit group 104 is arranged to electromagnetically couple to a respective qubit within the second qubit group 106, as indicated by dashed lines (e.g., couplings 124). In addition, each qubit within the first qubit group 104 has been tuned to have a qubit frequency within a first qubit frequency band Q1, and each qubit within the second qubit group 106 has been tuned to have a qubit frequency within a second qubit frequency band Q2. The use of different qubit frequency bands may reduce or eliminate undesired qubit-qubit interactions, as will be discussed in more detail in reference to FIG. 2.

The qubit frequency bands Q1 and Q2 may be different from one another. The qubit frequency bands Q1 and Q2 may be non-overlapping. The qubit frequency bands Q1 and Q2 may be separated from one another by, for example, at least 500 MHz, at least 750 MHz, or at least 1000 MHz.

As explained herein, the difference between a readout resonator's resonance frequency and the corresponding qubit's qubit frequency is referred to as the qubit-resonator detuning. If the qubit-resonator detuning is too large, then the dispersive shift in the resonance frequency induced by the qubit may be too small to reliably measure, or may be too small to reliably indicate the qubit state. However, if the qubit-resonator detuning is too small, then the qubit may exhibit increased energy relaxation, e.g., undergo undesired transitions. Therefore, in some embodiments, there is a preferred range of values for the qubit-resonator detuning.

In some embodiments, the qubit-resonator detuning may be at least 250 MHz, at least 500 MHz, or at least 1000 MHz. The qubit-resonator detuning may have a minimum value that depends on, for example, a qubit-resonator coupling strength or a nonlinearity of the qubit.

Although FIGS. 1A-1B show two groups of readout resonators with two resonance frequency bands, in some embodiments there are more than two groups of readout resonators or more than two resonance frequency bands. Although FIGS. 1A-1B show eight qubits, eight readout resonators, and two readout transmission lines, in some embodiments there are more or fewer of any of those components.

Figure 2:
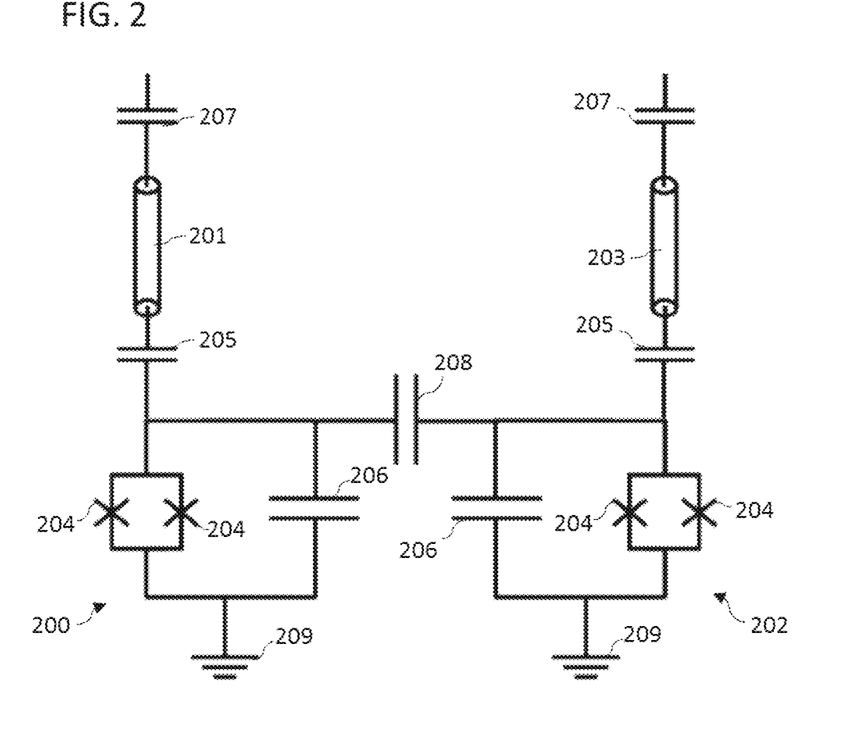
FIG. 2 is a schematic showing an exemplary pair of coupled qubits.

FIG. 2 shows two coupled transmon qubits 200, 202, each including two Josephson junctions 204 and a capacitance 206. The two qubits 200, 202 are arranged to electromagnetically couple via a capacitance 208. In some embodiments, qubits are arranged to electromagnetically couple via a tunable coupler. In some embodiments, each qubit is electrically connected to a common electrical ground 209.

Qubit 200 is arranged to electromagnetically couple to a first readout resonator 201, and qubit 202 is arranged to electromagnetically couple to a second readout resonator 203. The couplings may be, as shown, capacitive (e.g., capacitances 205). Each readout resonator 201, 203 is respectively coupled (e.g., via a capacitance 207) to a respective readout transmission line (not shown).

Various qubit designs are within the scope of this disclosure. The qubits may be, for example, Xmon qubits or transmon qubits. The qubits may be phase qubits, charge qubits, flux qubits, or hybridizations thereof. The qubits may include SQUIDs. Each qubit may include multiple superconductor islands.

Because the qubits 200, 202 in FIG. 2 are arranged to electromagnetically couple via the capacitance 208, the coupling may be referred to as a "direct" coupling. That is, during operation of the quantum processor, the coupling has a strength that depends on the relative qubit frequencies of the qubits 200, 202. In other embodiments, "indirect" coupling (i.e., coupling mediated through an additional circuit element) between qubits may be additionally or alternatively provided for; again, in some examples such indirect coupling may be dependent upon the relative frequencies of the qubits.

Thus, the strength of the coupling may depend on the relative qubit frequencies to which the qubits 200, 202 are tuned. When the qubit frequencies are closer together, the coupling strength is stronger, and, conversely, when the qubit frequencies are detuned from one another, the coupling strength is weaker. Therefore, when the qubits 200, 202 are not being used to perform entangling operations, the qubits 200, 202 may be tuned to have qubit frequencies that are sufficiently different, such that the qubits 200, 202 do not interact with one another in undesired ways. If qubit 200 has a qubit frequency within a first qubit frequency band Q1, and qubit 202 has a qubit frequency within a second qubit frequency band Q2, then a frequency separation between Q1 and Q2, as described above, can maintain a sufficient qubit frequency separation between qubits 200 and 202 and thereby reduce or eliminate undesired qubit-qubit interactions.

In some embodiments, pairs of coupled qubits may be characterized by a coupling rate, and the qubit frequency difference, or the frequency separation between qubit frequency bands, may be at least ten times the coupling rate, or at least 50 times the coupling rate, or at least 100 times the coupling rate.

Couplings between qubits in the context of readout resonators may create further opportunities for qubit state losses and undesired transitions. For example, in reference to FIG. 2, if readout resonator 203 is probed in order to measure the state of qubit 202, additional excitation states may be generated in the combined qubit-resonator (202-203) system. Some of these additional excitation states may be in resonance with qubit 200, such that qubits 200 and 202 may undergo a state swap. Maintaining a sufficient separation between the qubit frequencies of qubits 200 and 202 while also maintaining a sufficient qubit-resonator detuning, as described above, may reduce the likelihood of this phenomenon and others.

In some embodiments, each qubit has an anharmonicity, meaning a relative difference in frequency between the first excited state compared to the ground state and the second excited state compared to the first excited state. The qubit-resonator detuning may be set to, for example, at least four times the qubit anharmonicity, or at least six times the qubit anharmonicity. In some embodiments, the qubit-resonator detuning is set to at least an integer multiple of the qubit anharmonicity, where the integer is approximately a number of states in a transmon potential of the qubit. Qubit-resonator detunings may be, for example, within 1.0 GHz and 1.8 GHz; between 1.1 GHz and 1.7 GHz; and between 1.3 GHz and 1.5 GHz.

This disclosure has identified several features that may be included in a quantum processor. First, the qubit-resonator detunings may fall within an optimal range, being neither too small (in order to avoid energy relaxation and undesired transitions) nor too large (in order to allow qubit state readout). Second, readout resonators along a single readout transmission line may have resonance frequencies that are different from one another but that also fall within the amplifier frequency band of an amplifier coupled to the readout transmission line. Third, coupled qubits may be tuned to have sufficiently different qubit frequencies, such that undesired qubit-qubit interactions are avoided.

Figure 3:
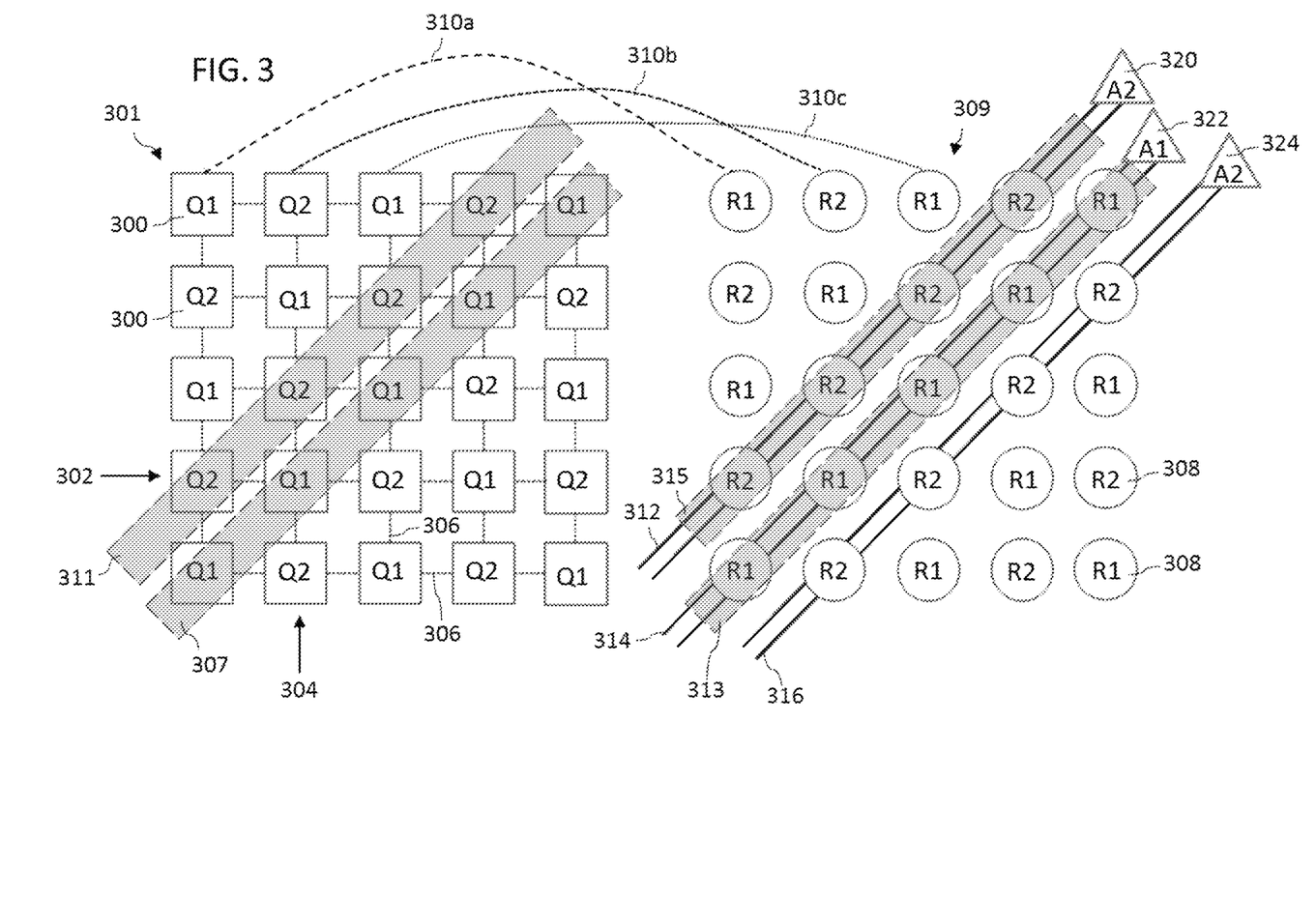
FIGS. 3-4 are schematics showing exemplary quantum processors.

The example of FIG. 3 shows a quantum processor design capable of including these several features. Qubits (e.g., qubits 300) are arranged in a two-dimensional qubit array 301, such that nearest-neighbor qubits within each row (e.g., row 302) and within each column (e.g., column 304) are arranged to electromagnetically couple with one another, as indicated by dashed lines (e.g., couplings 306). Some qubits (e.g., qubits in a first qubit group 307 extending along a first diagonal of the qubit array 301) have a qubit frequency within a first qubit frequency band Q1, while some qubits (e.g., qubits in a second qubit group 311 extending along a second diagonal of the qubit array 301) have a qubit frequency within a second qubit frequency band Q2. The qubit frequencies are tuned with qubit frequencies within each row and column alternating between Q1 and Q2, such that each qubit in the first qubit group 307 is arranged to electromagnetically couple to at least one qubit in the second qubit group 311, and each qubit in the second qubit group 311 is arranged to electromagnetically couple to at least one qubit in the first qubit group 307. Qubits in the first qubit group 307 are directly adjacent to qubits in the second qubit group 311. Each qubit group 307, 311 includes qubits extending along a respective diagonal of the qubit array 301.

The quantum processor also includes multiple readout resonators (e.g., readout resonators 308). In FIG. 3, these readout resonators are shown arranged in a two-dimensional resonator array 309 matching the two-dimensional qubit array 301, meaning that each readout resonator is arranged to electromagnetically couple to the corresponding qubit having a position in the qubit array 301 that matches the readout resonator's position in the resonator array 309. Several of these couplings are indicated by the dashed lines 310a, 310b, 310c. Note, though, that the respective positions of the qubit array 301 and the resonator array 309 are merely for schematic illustration. In some embodiments, the arrays 301 and 309 are superimposed, with, for example, each readout resonator adjacent to the qubit to which the readout resonator is coupled. In some embodiments, the qubits define enclosed areas between qubits, and the readout resonators are each in a respective enclosed area. In some embodiments, even when the qubits 300 are arranged in an array, the readout resonators 308 themselves are not arranged in a corresponding array.

The readout resonators include a first group of readout resonators 313 with resonance frequencies in a first resonance frequency band R1 and a second group of readout resonators 315 with resonance frequencies in a second resonance frequency band R2. Each qubit having a qubit frequency in the qubit frequency band Q1 is arranged to electromagnetically couple to a respective readout resonator having a resonance frequency in the resonance frequency band R1, and each qubit having a qubit frequency in the qubit frequency band Q2 is arranged to electromagnetically couple to a respective readout resonator having a resonance frequency in the resonance frequency band R2. Each readout resonator in the first readout resonator group 313 is arranged to electromagnetically couple to a respective qubit in the first qubit group 307 along a first diagonal of the qubit array 301, and each readout resonator in the second readout resonator group 315 is arranged to electromagnetically couple to a respective qubit in the second qubit group 311 along a second diagonal of the qubit array 301. As will be illustrated below, this pattern of couplings helps include the noted design features.

Readout transmission lines 312, 314, 316 are arranged to electromagnetically couple to respective groups of readout resonators, as shown. For example, readout transmission line 314 couples to the first group of readout resonators 313, and readout transmission line 312 couples to the second group of readout resonators 315. Note that other readout transmission lines, not shown, may be included to couple to the remaining readout resonators.

Each readout transmission line 312, 314, 316 is arranged to read out, via a respective group of readout resonators, qubits in a respective qubit group lying along a respective diagonal of the qubit array 301. For example, readout transmission line 312 can be used to read out the states of qubits in the second qubit group 311. Adjacent diagonals of the qubit array 301 (e.g., adjacent qubit groups, each qubit group extending along a diagonal of the qubit array 301) may correspond to different readout resonator groups having different resonance frequency bands. In some embodiments, the readout resonators are physically arranged in the readout resonator array 309 (which may be superimposed over the qubit array 301), the readout resonator array 301 is oriented such that the readout resonators are in relative positions to each other corresponding to the relative positions of the readout resonators' respective coupled qubits in the qubit array 301, and the readout transmission lines 312, 314, 316 physically extend along diagonals of the readout resonator array 309 and/or diagonals of the qubit array 301.

Each readout transmission line 312, 314, 316 is also arranged to be coupled to a respective amplifier 320, 322, 324. Each amplifier 320, 322, 324 has a corresponding amplifier frequency band A1 or A2. As shown in FIG. 3, amplifiers 320, 324 having amplifier frequency band A2 are arranged to electromagnetically couple to readout resonators having resonance frequencies in the band R2, and amplifier 322, which has an amplifier frequency band A1, is arranged to electromagnetically couple to readout resonators having resonance frequencies in the band R1. By this linkage of the resonance frequency bands to the amplifier frequency bands, each amplifier 320, 322, 324 can be operated to amplify signals with frequencies in only the amplifier's respective amplifier frequency band.

As indicated above in reference to FIGS. 1A-1B, although FIG. 3 shows only two qubit frequency bands, two resonance frequency bands, and two amplifier frequency bands, there may be more than two of any or all of these frequency bands. Although FIG. 3 shows qubits in a 5×5 array, in some embodiments the qubits are in an array having different dimensions or are not arranged in an array.

In some embodiments, the quantum processor (e.g., the quantum processor of FIG. 3) is based on unit cells, each unit cell including a group of qubits and corresponding readout and control elements used to control and read out that group of qubits. Each unit cell may be configured such that components included in the unit cell do not overlap with components of other units cells. Therefore, in some embodiments, a unit cell-based quantum processor may allow tiling of unit cells in one or more dimensions to expand the number of qubits in the quantum processor.

In some embodiments, a qubit frequency band of a qubit group of each unit cell alternates between adjacent unit cells. For example, a first unit cell may include a first qubit group tuned to within a first qubit frequency band, a second unit cell may include a second qubit group tuned to within a second qubit frequency band, and a third unit cell may include a third qubit group tuned to within the first qubit frequency band. The unit cells may be tiled in a particular direction, such that the first unit cell is adjacent to the second unit cell, and the second unit cell is adjacent to both the first unit cell and the third unit cell. Additional unit cells may also be included (e.g., adjacent to the third unit cell), and the additional unit cells may continue the alternating qubit frequency band arrangement. The unit cells may be tiled to form a unit cell array.

In some embodiments, resonance frequency bands, amplifier frequency bands, or both, may alternate between adjacent unit cells.

In some embodiments, components included in each unit cell do not overlap with components included in other unit cells. For example, components may be arranged on a side of a chip, a first area of the chip may include components of only a first unit cell, and a second area of the chip may include components of only a second unit cell. This may allow unit cells to be tiled without components from different unit cells interfering with one another, e.g., without readout transmission lines intersecting one another.

Each unit cell may include, for example, a group of qubits along a diagonal of a qubit array, along with associated readout elements. For example, a unit cell might include the first qubit group 307, the first readout resonator group 313, and the readout transmission line 314. In some embodiments, qubits in each unit cell are arranged to couple to qubits in adjacent unit cells. In some embodiments, qubits within each unit cell are arranged to be read using a single readout transmission line. In some embodiments, the frequency relations and frequency characteristics described herein for "groups" of components may apply to unit cells of components.

Figure 4:
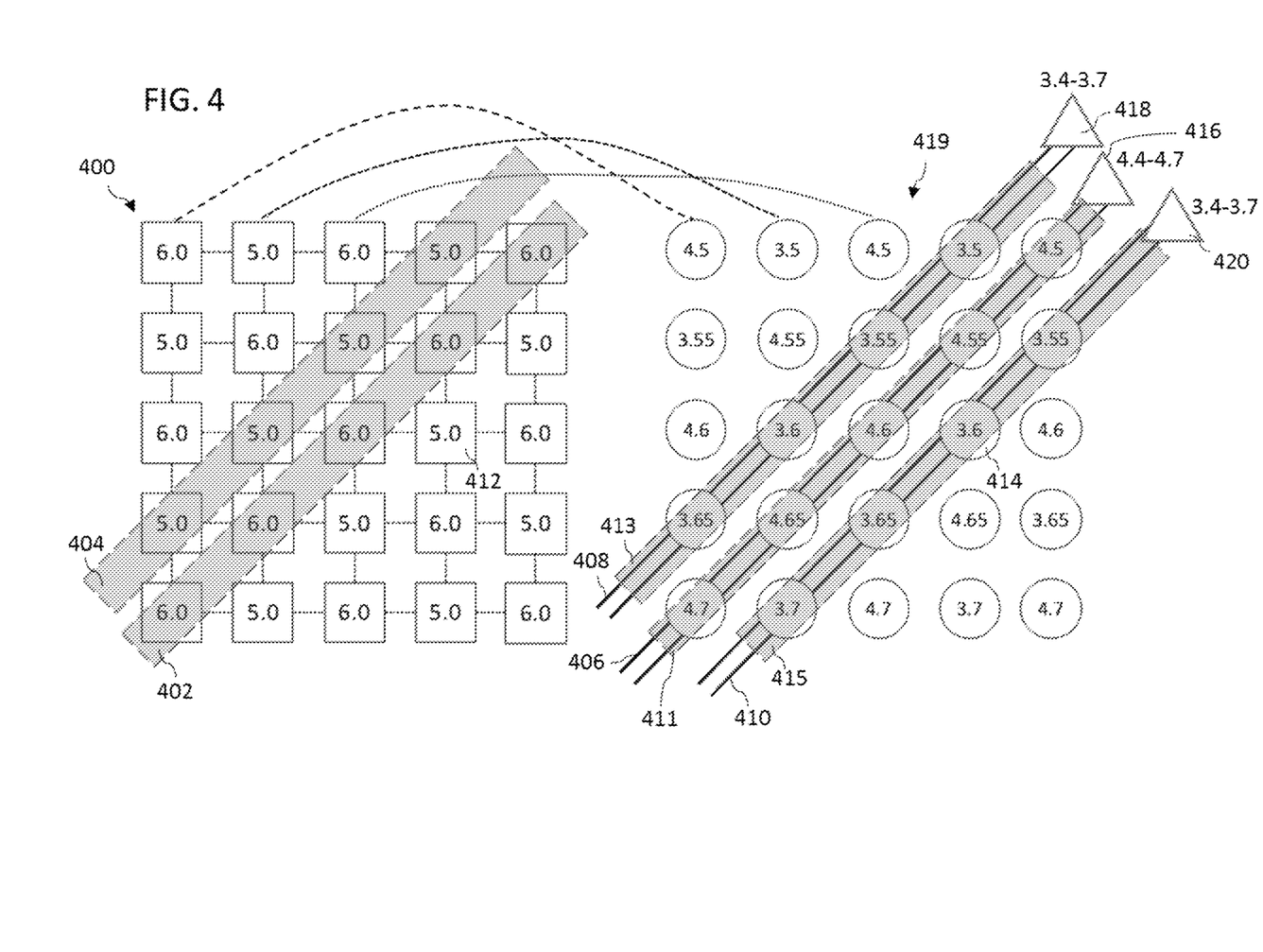

FIG. 4 shows a quantum processor according to the design of FIG. 3, except that FIG. 4 shows example numbers, in GHz, for the qubit frequencies, resonance frequencies, and amplifier frequency bands. The example numbers are displayed inside each component, or, for the amplifier frequency bands, adjacent to each amplifier.

As shown in FIG. 4, the qubits include multiple qubits having qubit frequencies 5.0 GHz and multiple qubits having qubit frequencies 6.0 GHz. For example, a first group of qubits 402 extending along a first diagonal of a qubit array 400 has qubit frequencies 6.0 GHz, and a second group of qubits 404 extending along a second diagonal of the qubit array 400 has qubit frequencies 5.0 GHz. In this case, then, a first qubit frequency band is a narrow band at 5.0 GHz, and a second qubit frequency band is a narrow band at 6.0 GHz, with a separation between the two qubit frequency bands of 1.0 GHz. In some embodiments, rather than all having the substantially same qubit frequency, qubits within each qubit group 402, 404 may have qubit frequencies varying across the first or second qubit frequency band. For example, qubits in the first qubit group 402 may have qubit frequencies varying between 5.8 GHz and 6.2 GHz, and qubits in the second qubit group 404 may have qubit frequencies varying between 4.8 GHz and 5.2 GHz.

The qubits tuned to qubit frequency 5.0 GHz are coupled to qubits tuned to qubit frequency 6.0 GHz. The 1.0 GHz frequency separation between these sets of coupled qubits is large enough to reduce or eliminate interactions between the qubits, even when the qubits are, for example, directly capacitively coupled. The qubits may be tuned to have more similar qubit frequencies when, during operation of the quantum processor, it is desired that qubits interact with one another more strongly.

In some embodiments, the qubit frequency separation between coupled qubits may be tuned to be, for example, at least 0.5 GHz, at least 0.75 GHz, at least 1.0 GHz, or at least 1.25 GHz.

The readout resonators include multiple readout resonators having resonance frequencies in a first resonance frequency band of 4.5 GHz to 4.7 GHz and multiple readout resonators having resonance frequencies in a second resonance frequency band of 3.5 GHz to 3.7 GHz. For example, readout resonators coupled to readout transmission line 406 are in a first readout resonator group 411 and have resonance frequencies between 4.5 GHz and 4.7 GHz; readout resonators coupled to readout transmission line 408 are in a second readout resonator group 413 and have resonance frequencies between 3.5 GHz and 3.65 GHz; and readout resonators coupled to readout transmission line 410 are in a third readout resonator group 415 and have resonance frequencies between 3.55 GHz and 3.7 GHz. The remaining readout resonators, which are coupled to readout transmission lines that are not shown in FIG. 4, have resonance frequencies in either the first resonance frequency band or the second resonance frequency band, with resonance frequency bands alternating along adjacent diagonals of the readout resonator array 419 as shown in FIG. 4.

Within each readout resonator group 411, 413, 415, resonance frequencies are separated by an intra-band resonance frequency separation. In the example of FIG. 5, readout resonators coupled to readout transmission line 408 have resonance frequencies 3.5 GHz, 3.55 GHz, 3.6 GHz, and 3.65 GHz, such that the intra-band resonance frequency separation is 50 MHz. Therefore, the respective qubits coupled to each of these readout resonators can be individually read out via application of a pulse of appropriate frequency to the readout transmission line 408. For example, to read out qubit 412, which is coupled to readout resonator 414 having resonance frequency 3.6 GHz, a signal having frequency 3.6 GHz may be applied to readout transmission line 410.

In some embodiments, the intra-band resonance frequency separation along a single readout transmission line is different for different pairs of closest-resonator-frequency readout resonators. For example, four readout resonators coupled to a single readout transmission line may have respective resonance frequencies of 3.5 GHz, 3.55 GHz, 3.61 GHz, and 3.64 GHz.

As explained herein, the qubit-resonator detuning may be set to a preferred range of values. In the example of FIG. 4, readout resonators having resonance frequencies between 4.5 GHz and 4.7 GHz are arranged to electromagnetically couple to qubits having qubit frequency 6.0 GHz, meaning that the qubit-resonator detuning is between 1.3 GHz and 1.5 GHz. Meanwhile, readout resonators having resonance frequencies between 3.5 GHz and 3.7 GHz are arranged to electromagnetically couple to qubits having qubit frequency 5.0 GHz, meaning that the qubit-resonator detuning for those readout resonators is also between 1.3 GHz and 1.5 GHz. If, for example, the qubits have anharmonicity 200 MHz, then a desired minimum value of the qubit-resonator detuning may be 1.2 GHz, and a condition for minimum qubit-resonator detuning may therefore be satisfied. Undesired transitions and interactions, such as state-swapping, may therefore be reduced.

As explained herein, resonance frequency bands may be within corresponding amplifier frequency bands. In the example of FIG. 4, the readout transmission lines 406, 408, 410 are arranged to electromagnetically couple to respective amplifiers 416, 418, 420. The amplifiers 416, 418, 420 have respective amplifier frequency bands matching either a first amplifier frequency band of 4.4 GHz to 4.7 GHz or a second amplifier frequency band of 3.4 GHz to 3.7 GHz, as shown. The readout resonators coupled to the readout transmission lines 406, 408, 410 of these respective amplifiers 416, 418, 420 have resonance frequencies within these amplifier frequency bands: for example, amplifier 418 can be used to amplify resonance frequency signals of 3.5 GHz, 3.55 GHz, 3.6 GHz, and 3.65 GHz, all of which fall within the amplifier's 418 amplifier frequency band of 3.4 GHz to 3.7 GHz. Because of this, the signals can be amplified with less or no accompanying loss in fidelity.

Note that the frequency values shown in FIG. 4 are merely examples. A wide variety of frequency values, desired frequency relationships, patterns of qubit groups and resonator groups, ranges of frequency bands, and physical layouts of the processor components are within the scope of this disclosure.

In some embodiments, the use of different qubit frequency bands and different resonance frequency bands for two groups of qubits and two groups of readout resonators may reduce crosstalk compared to examples in which qubits from two qubit groups are read out via the same readout transmission line. For example, a readout procedure might include probing only a readout transmission line coupled to readout resonators coupled to qubits in the second qubit group, reducing the chance of accidentally reading out the state of a qubit in the first qubit group.

Figure 5A:
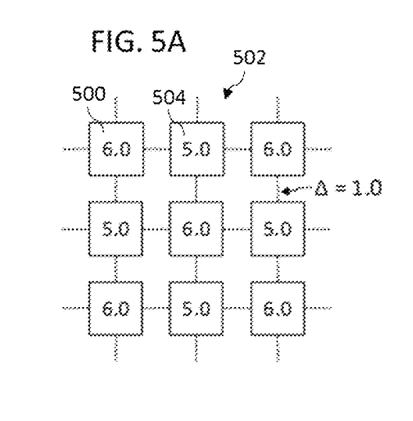
FIG. 5A is a schematic showing an exemplary qubit array.
Figure 5B:
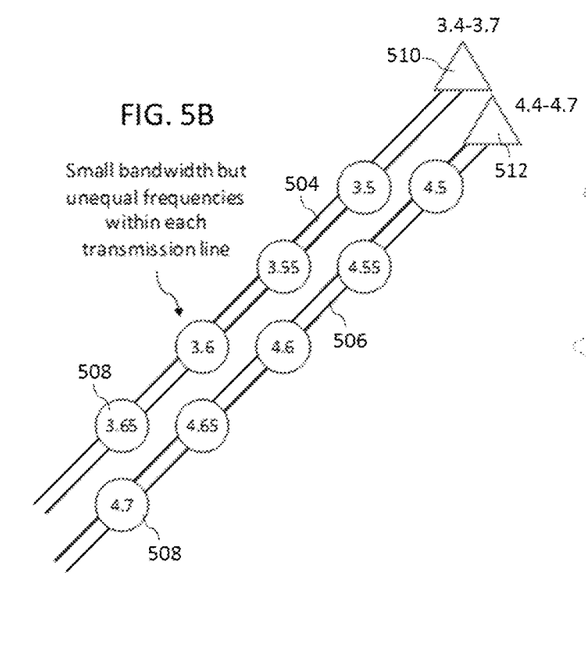
FIG. 5B is a schematic showing exemplary groups of readout resonators and readout transmission lines.
Figure 5C:
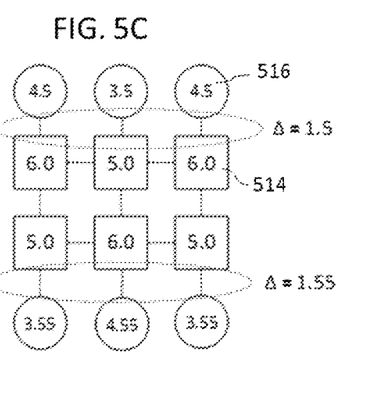
FIG. 5C is a schematic showing exemplary coupled qubits and readout resonators.

FIGS. 5A-5C show selected portions of the quantum processor of FIG. 4 in order to illustrate how the design of the quantum processor of FIG. 4 includes the design features outlined above. Note that, as shown in FIG. 4, the configuration of components in FIGS. 5A-5C may be simultaneously included in a single quantum processor; the components are schematically broken out separately into FIGS. 5A-5C for clarity.

As shown in FIG. 5A, nearest-neighbor qubits along rows and columns of the two-dimensional qubit array 502 are coupled. For example, a first qubit 500 is coupled to a second qubit 504 that is a nearest neighbor to the first qubit 500. Qubit frequency bands (qubit frequency values being shown inside each qubit) alternate along the rows and columns, such that the qubit frequency difference between coupled, nearest-neighbor qubits (e.g., qubits 500 and 502) is at least some minimum value (in the example of FIG. 5A, 1.0 GHz). Therefore, in this configuration of the quantum processor, the coupling strength between nearest-neighbor qubits will be smaller than if coupled qubits had qubit frequencies closer in value, and undesired qubit-qubit interactions may be reduced or eliminated.

As shown in FIG. 5B, along each readout transmission line 504, 506, the resonance frequencies (shown inside each readout resonator, e.g., readout resonators 508) of the readout resonators differ from one another. In the example of FIG. 5B, the resonance frequencies along each transmission line differ by an intra-band resonance frequency separation of 50 MHz, allowing multiplexed, individual readout of the qubits (not shown) coupled to the readout resonators.

In addition, the resonance frequencies along each readout transmission line 504, 506 are within the amplifier frequency bands of respective amplifiers 510, 512 arranged to couple to the readout transmission lines 504, 506. The amplifiers 510, 512 will therefore properly amplify resonance frequency signals going to or from the readout resonators, while decreasing any loss of signal fidelity.

As shown in FIG. 5C, each qubit is arranged to electromagnetically couple to a corresponding readout resonator (e.g., qubit 514 can couple to readout resonator 516). The qubit-resonator detunings of the quantum processor of FIG. 5C are 1.55 GHz or 1.5 GHz, as shown, which allows state fidelities to be maintained and the occurrence of undesired transitions, such as state-swapping between qubits, to be reduced. These values of qubit-resonator detuning are merely an example; a range of qubit-resonator detuning values is within the scope of this disclosure.

Electromagnetic couplings between components may be, for example, capacitive, inductive, or both capacitive and inductive. In some embodiments, couplings between components are couplings through a space between two chips on which two components are respectively positioned. For example, in some implementations, a qubit positioned on a first chip may be electromagnetically coupled to a readout resonator positioned on a second separate chip that is bump bonded to and facing the first chip. In some embodiments, couplings are in-plane, with a direction of a coupling electric field and/or magnetic field being substantially in a plane of a side of a chip on which both of two components are positioned. For example, in some implementations, a qubit on a first surface of a silicon substrate may be electromagnetically coupled to a readout resonator on the first surface of the silicon substrate.

Quantum circuit components (also referred to as quantum computing circuit components) disclosed herein include circuit components for performing quantum processing operations. That is, the quantum circuit components are configured to make use of quantum-mechanical phenomena, such as superposition and entanglement, to perform operations on data in a non-deterministic manner. Certain quantum circuit components, such as qubits, may be configured to represent and operate on information in more than one state simultaneously. Examples of superconducting quantum circuit components include circuit elements such as quantum LC oscillators, qubits (e.g., flux qubits, phase qubits, or charge qubits), readout resonators, readout transmission lines, amplifiers, and superconducting quantum interference devices (SQUIDs) (e.g., RF-SQUID or DC SQUID), among others.

In contrast, classical circuit elements generally process data in a deterministic manner. Classical circuit elements may be configured to collectively carry out instructions of a computer program by performing basic arithmetical, logical, and/or input/output operations on data, in which the data is represented in analog or digital form. In some implementations, classical circuit elements may be used to transmit data to and/or receive data from the quantum circuit components through electrical or electromagnetic connections. Examples of classical circuit elements include circuit elements based on CMOS circuitry, rapid single flux quantum (RSFQ) devices, reciprocal quantum logic (RQL) devices and ERSFQ devices, which are an energy-efficient version of RSFQ that does not use bias resistors.

Any or all of the components mentioned in this disclosure, including the qubits, the readout resonators, the readout transmission lines, and the amplifiers, may be made of a superconductor material, such as aluminum, niobium, or titanium nitride, among other superconductor materials. The components may include both superconductor and non-superconductor material.

Fabrication of the circuit elements disclosed herein may entail the deposition of one or more materials, such as superconductors, dielectrics and/or metals. Depending on the selected material, these materials can be deposited using deposition processes such as chemical vapor deposition, physical vapor deposition (e.g., evaporation or sputtering), or epitaxial techniques, among other deposition processes. Processes for fabricating circuit elements described herein may entail the removal of one or more materials from a device during fabrication. Depending on the material to be removed, the removal process may include, e.g., wet etching techniques, dry etching techniques, or lift-off processes. The materials forming the circuit elements described herein can be patterned using known lithographic techniques (e.g., photolithography or e-beam lithography).

During operation of a quantum computational system that uses circuit elements formed, in part, from superconductors, such as the circuit elements described herein, the circuit elements are cooled down within a cryostat to temperatures that allow a superconductor material to exhibit superconducting properties. A superconductor (also referred to as superconducting) material may be understood as material that exhibits superconducting properties at or below a superconducting critical temperature. Examples of superconducting material include aluminum (superconductive critical temperature of 1.2 kelvin) and niobium (superconducting critical temperature of 9.3 kelvin). Accordingly, superconducting structures, such as superconducting traces and superconducting ground planes, are formed from material that exhibits superconducting properties at or below a superconducting critical temperature.

In certain implementations, control signals for the quantum circuit components (e.g., qubits and qubit couplers) may be provided using classical circuit elements that are electrically and/or electromagnetically coupled to the quantum circuit components. The control signals may be provided in digital and/or analog form.

While this specification contains many specific implementation details, these should not be construed as limitations on the scope of what may be claimed, but rather as descriptions of features that may be specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination.

Moreover, although features may be described above as acting in certain combinations and even initially claimed as such, one or more features from a claimed combination may in some cases be excised from the combination, and the claimed combination may be directed to a sub-combination or variation of a sub-combination.

Particular embodiments of the subject matter have been described. Other embodiments are within the scope of the following claims. For example, the actions recited in the claims may be performed in a different order and still achieve desirable results. As one example, the processes depicted in the accompanying figures do not necessarily require the particular order shown, or sequential order, to achieve desirable results.

What is claimed is:

1. An apparatus comprising:
a plurality of qubits arranged in a two-dimensional array;
a plurality of readout resonators, wherein each qubit of the plurality of qubits is arranged to electromagnetically couple to a respective readout resonator of the plurality of readout resonators;
a first readout transmission line arranged to electromagnetically couple to a first readout resonator group of at least two readout resonators of the plurality of readout resonators,
wherein each readout resonator of the first readout resonator group is arranged to electromagnetically couple to a respective qubit of a first qubit group of at least two qubits of the plurality of qubits; and
a second readout transmission line arranged to electromagnetically couple to a second readout resonator group of at least two readout resonators of the plurality of readout resonators,
wherein each readout resonator of the second readout resonator group is arranged to electromagnetically couple to a respective qubit of a second qubit group of at least two qubits of the plurality of qubits,
wherein a resonance frequency of each readout resonator of the first readout resonator group is within a first resonance frequency band, and a resonance frequency of each readout resonator of the second readout resonator group is within a second resonance frequency band that is different from the first resonance frequency band;
wherein the first qubit group extends along a first diagonal of the two-dimensional array, and wherein the second qubit group extends along a second diagonal of the two-dimensional array.

2. The apparatus of claim 1, wherein the first qubit group is directly adjacent to the second qubit group.

3. The apparatus of claim 1, wherein the first resonance frequency band is non-overlapping with the second resonance frequency band.

4. The apparatus of claim 3, wherein the first resonance frequency band is separated from the second resonance frequency band by at least 500 MHz.

5. The apparatus of claim 1, wherein the first readout transmission line is arranged to electromagnetically couple to a first amplifier, and the first resonance frequency band is within an amplifier frequency band of the first amplifier, and
wherein the second readout transmission line is arranged to electromagnetically couple to a second amplifier, and the second resonance frequency band is within an amplifier frequency band of the second amplifier, and
wherein the amplifier frequency band of the first amplifier is different from the amplifier frequency band of the second amplifier.

6. The apparatus of claim 1, wherein each readout resonator of the first readout resonator group has a respective resonance frequency that is different from respective resonance frequencies of other readout resonators of the first readout resonator group.

7. The apparatus of claim 6, wherein the respective resonance frequencies of the readout resonators of the first readout resonator group are separated from one another by at least 50 MHz.

8. The apparatus of claim 6, wherein the respective resonance frequencies of the readout resonators of the first readout resonator group are separated from one another by at least a linewidth of each readout resonator.

9. The apparatus of claim 1, wherein each qubit of the first qubit group is arranged to be electromagnetically couplable to at least one qubit of the second qubit group, and
wherein each qubit of the second qubit group is arranged to electromagnetically couple to at least one qubit of the first qubit group.

10. The apparatus of claim 9, wherein each qubit of the first qubit group is arranged to capacitively couple to at least one qubit of the second qubit group, and
wherein each qubit of the second qubit group is arranged to capacitively couple to at least one qubit of the first qubit group.

11. A method comprising:
providing a plurality of qubits, a plurality of readout transmission lines, and a plurality of readout resonators, wherein the plurality of qubits are arranged in a two-dimensional array, wherein a first readout transmission line is arranged to couple to a first readout resonator group of at least two readout resonators of the plurality of readout resonators, each readout resonator of the first readout resonator group being coupled to a qubit of a first qubit group of at least two qubits of the plurality of qubits, and wherein a second readout transmission line is arranged to couple to a second readout resonator group of at least two readout resonators of the plurality of readout resonators, each readout resonator of the second readout resonator group being coupled to a qubit of a second qubit group of at least two qubits of the plurality of qubits;

tuning each qubit of the first qubit group to a respective qubit frequency within a first qubit frequency band; and tuning each qubit of the second qubit group to a respective qubit frequency within a second qubit frequency band, wherein the first qubit frequency band is non-overlapping with the second qubit frequency band;

wherein the first qubit group extends along a first diagonal of the two-dimensional array, and wherein the second qubit group extends along a second diagonal of the two-dimensional array.

12. The method of claim 11, wherein the first qubit frequency band is separated from the second qubit frequency band by at least 750 MHz.

13. The method of claim 11, wherein the first qubit group along the first diagonal is directly adjacent to the second qubit group along the second diagonal.

14. The method of claim 11, wherein a resonance frequency of each readout resonator of the first readout resonator group is within a first resonance frequency band, and a resonance frequency of each readout resonator of the second readout resonator group is within a second resonance frequency band that is different from the first resonance frequency band.

15. The method of claim 14, comprising providing a first amplifier arranged to couple to the first readout transmission line, the first amplifier having a first amplifier frequency band, and providing a second amplifier arranged to couple to the second readout transmission line, the second amplifier having a second amplifier frequency band, the second amplifier frequency band being different from the first amplifier frequency band, wherein the first resonance frequency band is within the first amplifier frequency band, and wherein the second resonance frequency band is within the second amplifier frequency band.

16. The method of claim 14, wherein the first resonance frequency band is non-overlapping with the second resonance frequency band.

17. The method of claim 11, wherein, for each qubit of the first qubit group, a frequency difference between the respective qubit frequency of the qubit and a resonance frequency of a corresponding readout resonator of the first readout resonator group to which the qubit is coupled is between 1.0 GHz and 1.8 GHz, and wherein, for each qubit in the second qubit group, a frequency difference between the respective qubit frequency of the qubit and a resonance frequency of a corresponding readout resonator in the second readout resonator group to which the qubit is coupled is between 1.0 GHz and 1.8 GHz.

18. The method of claim 11, wherein each qubit of the plurality of qubits has a respective anharmonicity, wherein, for each qubit of the first qubit group and for each qubit of the second qubit group, a frequency difference between the respective qubit frequency of the qubit and a resonance frequency of a corresponding readout resonator to which the qubit is coupled is at least six times the respective anharmonicity of the qubit.

19. The method of claim 11, wherein, for each qubit of the first qubit group and for each qubit of the second qubit group, a frequency difference between the respective qubit frequency of the qubit and a resonance frequency of a corresponding readout resonator to which the qubit is coupled is at least 1.3 GHz.

20. The method of claim 11, comprising measuring a resonance frequency of a readout resonator of the first readout resonator group, and based on the measured resonance frequency, determining a state of a corresponding qubit of the first qubit group to which the readout resonator is coupled.

21. The method of claim 11, wherein each qubit of the first qubit group is arranged to electromagnetically couple to at least one qubit of the second qubit group, and wherein each qubit of the second qubit group is arranged to electromagnetically couple to at least one qubit of the first qubit group.

22. The method of claim 21, wherein couplings between qubits of the first qubit group and the second qubit group have a coupling rate, and wherein the first qubit frequency band is separated from the second qubit frequency band by at least 50 times the coupling rate.

23. The method of claim 11, wherein a first unit cell comprises the first qubit group, wherein a second unit cell comprises the second qubit group, and wherein a third unit cell comprises a third qubit group of two or more qubits of the plurality of qubits, the first unit cell, the second unit cell, and the third unit cell being tiled in a first direction to form a unit cell array.

24. The method of claim 23, comprising tuning each qubit of the third qubit group to have a respective qubit frequency within the first qubit frequency band.

* * * * *